United States Patent [19]

Grover

[11] 4,130,015
[45] Dec. 19, 1978

[54] SAFE TAKE-OFF INDICATORS

[75] Inventor: John H. H. Grover, Ashford, England

[73] Assignee: National Research Development Corporation, London, England

[21] Appl. No.: 766,643

[22] Filed: Feb. 8, 1977

[30] Foreign Application Priority Data

Feb. 9, 1976 [GB] United Kingdom ............... 4984/76

[51] Int. Cl.² ........................................... G01C 21/10
[52] U.S. Cl. ................................... 73/178 T; 364/427
[58] Field of Search .................. 73/178 R, 178 T; 235/150.2, 150.22; 244/76 R, 183; 340/27 R, 27 SS; 364/427

[56] References Cited

U.S. PATENT DOCUMENTS

| | | | |
|---|---|---|---|
| 3,048,329 | 8/1962 | Berggren | 73/178 T X |
| 3,174,710 | 3/1965 | Hoekstra | 73/178 T X |
| 3,182,498 | 5/1965 | Koletsky et al. | 73/178 T |
| 3,192,503 | 6/1965 | Lang | 73/178 T X |
| 3,709,033 | 1/1973 | Pollitt | 73/178 T |
| 3,863,204 | 1/1975 | Hoekstra | 340/27 R |

*Primary Examiner*—Stephen G. Kunin
*Attorney, Agent, or Firm*—Blanchard, Flynn, Thiel, Boutell & Tanis

[57] ABSTRACT

An on-board take-off performance indicator system for an aircraft includes a ground-engaging wheel which measures distance run during take-off and moves the slider of a selected one of a bank of potentiometers in response thereto. Each potentiometer is wound in accordance with a respective defined speed/distance characteristic. The selection of the potentiometer can be completely manual but is preferably in response to an electrical analogue of a graphical method which takes account of parameters individual to a particular take-off. An indication of expected speed in view of distance run is provided by the potentiometer output by means of an index on the airspeed indicator in the aircraft.

10 Claims, 6 Drawing Figures

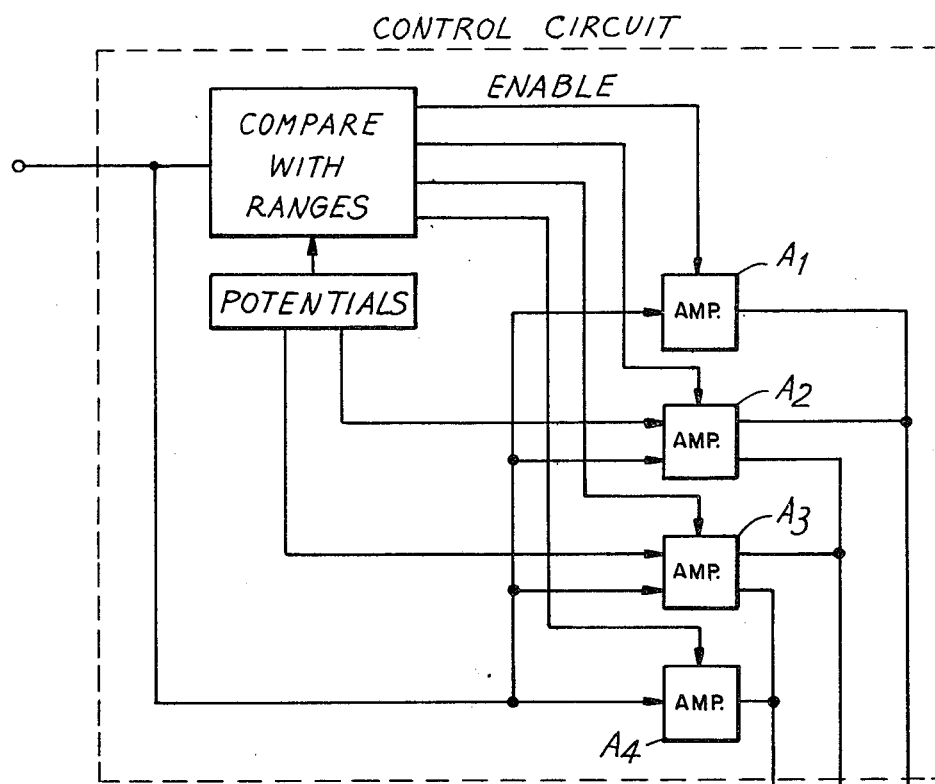
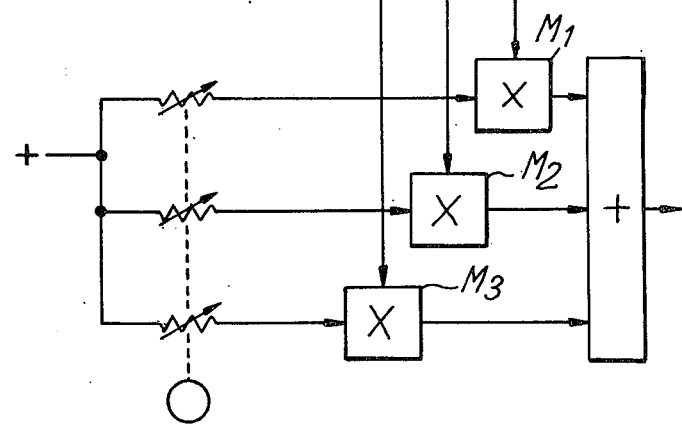
FIG.5A

SAFE TAKE-OFF INDICATORS

BACKGROUND OF THE INVENTION

This invention concerns an aircraft take-off performance indicator system.

In most countries regulations stipulate minimum accelerations during the take-off run of specified transport aircraft. In addition, for every take-off a decision point is established in terms of air speed, known as the $V_1$ speed. Assuming that the aircraft adopts its minimum legal acceleration characteristic for any given take-off, this $V_1$ speed corresponds to a particular point along the runway, known as the $V_1$ distance. If a power unit fails before this decision point is reached then, by regulation, the take-off must be aborted. If a power unit fails at the decision point the pilot has discretion and may either continue or abort the take-off depending upon his own judgment of the situation. If a power unit fails after this point the take-off shall be capable of, and by regulation must be, continued.

Conventionally, therefore, the pilot at the start of his take-off run notes down the $V_1$ speed for that take-off and in the event of engine failure compares his actual speed with the $V_1$ speed to decide whether to continue with the take-off or abort it. There is however a serious danger in this. If for any reason the aircraft does not achieve the minimum acceleration characteristic the $V_1$ speed will not be reached until after the $V_1$ distance has been passed. This means that the pilot's decision to abort the take-off will be made at a point further along the runway than has been assumed in the calculations, with possibly dangerous consequences. It will be appreciated that it is quite likely that a power unit which is on the point of failure will give less than its anticipated thrust, so that the danger of such occurrence could be substantial.

Proposals have been made to provide a distance indicator giving the pilot of an aircraft an indication of distance run (or of distance to the end of the runway) from which the pilot can make a decision to abort or continue with take-off, at or at a point near, the $V_1$ distance. Such arrangements are described in British Pat. No. 1,082,341 and a development thereof in British Pat. No. 1,327,771. In these patents, the $V_1$ speed and $V_1$ distance are pre-set by the pilot and an indication is given as to whether the $V_1$ distance is reached before the $V_1$ speed is attained, to enable him safely to abort the take-off run.

U.S. Pat. No. 2,922,982 describes a proposal for a continuous take-off performance indicator. In this proposal a sensing finger follows a groove in a plate which is moved during take-off by a drive from the aircraft wheels. The groove represents a specified speed versus distance characteristic. The finger is coupled to an extra pointer on the aircraft's existing air speed indicator, and thus the position of this extra pointer is dependent on the shape of the groove and hence the specified speed/distance characteristic. The pilot can thus compare his actual air speed with the speed determined by the shape of the groove.

The groove in the plate defines a curve which is arbitrary and fixed. Some adjustment is possible by rotating the plate about the origin of the curve so that at a pre-set $V_1$ distance it gives the required $V_1$ speed. In addition in the prior U.S. Patent a separate Go/No-Go indication is given at the pre-set $V_1$ distance as to whether or not the $V_1$ speed has actually been attained.

In practice the shape of the speed versus distance curve for any given take-off is dependent upon a large number of parameters. These may be divided broadly into the following categories:

(i) fixed characteristics of the aircraft;
(ii) fixed characteristics of the runway, e.g. its length and slope, and height above sea level;
(iii) aircraft and runway parameters individual to any particular take-off, e.g. all-up weight, and weather conditions such as temperature, wind and runway surface conditions; and
(iv) variable aircraft parameters such as flap condition and (possibly) the percentage of maximum attainable thrust which is to be used.

The system of U.S. Pat. No. 2,922,982 takes account only of the fixed aircraft characteristics. It cannot therefore give the pilot an accurate indication for any take-off of how the aircraft's actual performance compares with what he should expect. Furthermore the curve is embodied in mechanical form and the mechanical sensing of this curve is unsatisfactory and likely to lead to errors.

This invention has the object of providing a continuous and accurate indication of take-off performance in which the likelihood of error is reduced.

SUMMARY OF THE INVENTION

The on-board take-off performance indicator system of this invention includes means which defines electrically a plurality of different speed versus distance curves, and means for selecting a desired one of these curves in dependence upon parameters relevant to an individual take-off. Means are provided to generate a first electrical signal representative of the distance traversed by the aircraft during a take-off run, and this first electrical signal is applied to the curve-defining means to generate a second electrical signal representative of the speed associated by the selected curve with the distance defined by the first signal. A display, preferably on the existing air speed indicator (ASI) in the aircraft, is provided of this derived speed.

One simple form which the curve-defining means may take is of a bank of potentiometers wound with a resistance/movement characteristic corresponding to the desired speed/distance characteristic of the aircraft. A number of such potentiometers can be included in a small space and the desired potentiometer selected by a simple switching operation. The slider of at least the selected potentiometer is driven by a motor or servo coupled electrically to a distance measuring device which can be as described in the aforementioned British Patents.

In an improved system a plurality of additional switchable potentiometer banks are provided in which the banks are connected in series with each other and with the above-described potentiometer bank and in each bank a selected one of the potentiometers in that bank can be used. The sliders of the potentiometers of each bank are ganged together and can be moved by a manual control knob. In this way the invention permits the electrical combination of several factors which may be individual to a particular take-off in a manner which is relatively free from error.

BRIEF DESCRIPTION OF THE DRAWINGS

The invention will now be described by way of example with reference to the accompanying drawings, in which:

FIG. 5A illustrates an alternative form of part of the circuitry of FIG. 5.

DETAILED DESCRIPTION OF PREFERRED EMBODIMENTS OF THE INVENTION

As already mentioned for every transport aircraft and every take-off there are many parameters which affect the acceleration and hence there is an infinite family of curves that can be plotted in the form of distance versus required speed. However, this invention exploits the fact that in practice there is no need to simulate a large family directly. An adequate result can be achieved from the practical standpoint by providing means whereby a relatively small number can be simulated directly and further means whereby a selected one can be modified to provide a close approximation to the simulation required. The embodiment to be described exploits this as will now be described.

Figure 1:
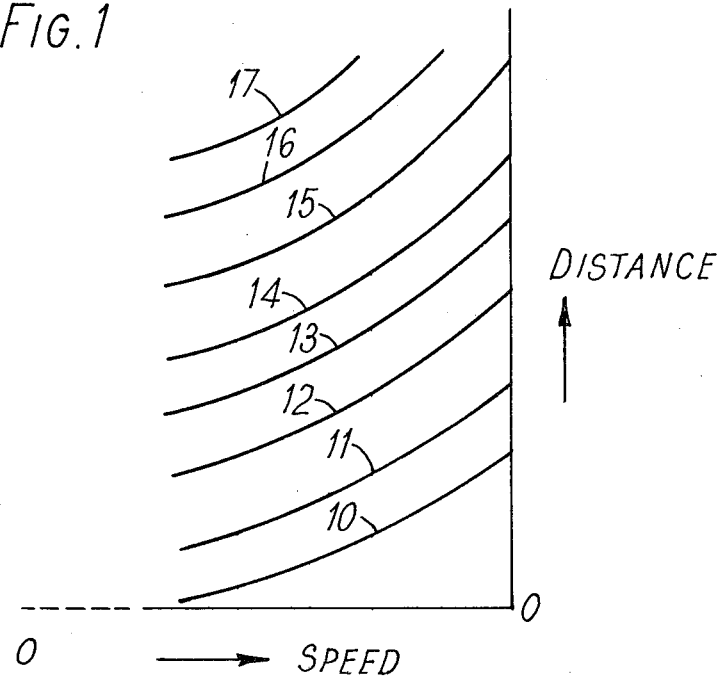
FIG. 1 shows a family of acceleration curves of an aircraft.

Referring to FIG. 1 this shows a family of eight curves 10 to 17 respectively relating airspeed (abscissa) against distance travelled along the runway (ordinate) of a fictitious aircraft. The eight different curves correspond to eight predetermined different sets of conditions affecting take-off for a given flap setting and correspond to the airspeed required or to be expected on the assumption that acceleration-performance is normal. For a different flap setting there would of course be a corresponding different set of eight curves.

It will be appreciated that potentiometers can be produced of which the resistance, with wiper movement, varies in accordance with the laws of the curves shown i.e. using resistance to represent airspeed and wiper movement to represent distance travelled. Potentiometers of specified laws are well known. Thus referring to FIG. 2, this shows eight potentiometers 18 to 25 respectively with their resistance elements connected between a terminal 26 and earth. The wipers of the potentiometers 18 to 25 are connected to the fixed contacts 27 to 34 respectively of a selector switch 35 of which the moving contact is connected to a step-motor 36.

The wipers of the potentiometers are ganged together and are driven by an electric motor or servo 37' coupled electrically to a distance-measuring wheel 37 to receive a distance-run signal therefrom, whereby rotation of the measuring wheel 37 causes a control signal to be provided at the wiper of the selected potentiometer, the magnitude of the control signal being dependent upon the distance run and the law of the selected potentiometer. The wheel 37 is preferably of the type described in the aforementioned British Patents. The control signal in turn causes rotation of the output shaft 38 of the step-motor 36 through an angle dependent both upon distance run and the law of the potentiometer selected by the selector switch 35. The laws of the potentiometers 18 to 25 are made to correspond to the laws of the curves 10 to 17 of FIG. 1 and hence for each selected potentiometer the shaft of the motor 36 turns through an angle accordingly indicative of required speed as the distance increases. The shaft 38 is connected through suitable gearing 39 to an auxiliary index 40 on an airspeed indicator shown in broken lines 41.

Figure 2:
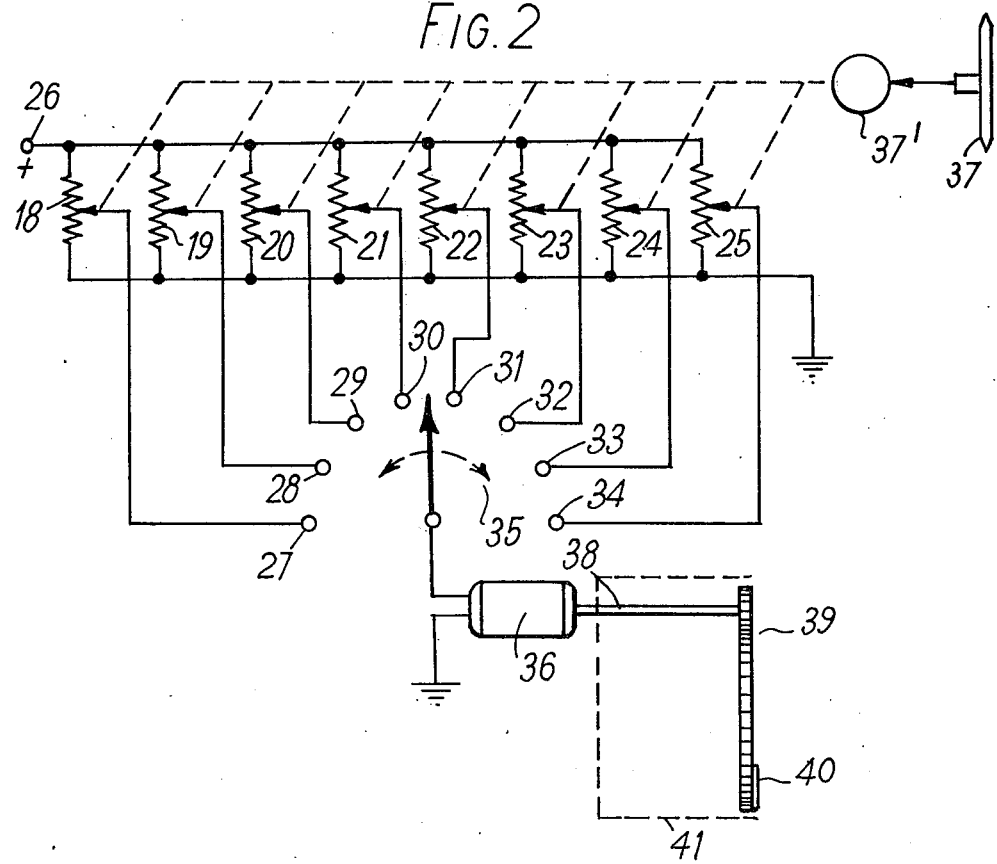
FIG. 2 is a schematic diagram of part of an embodiment of the invention.
Figure 3:
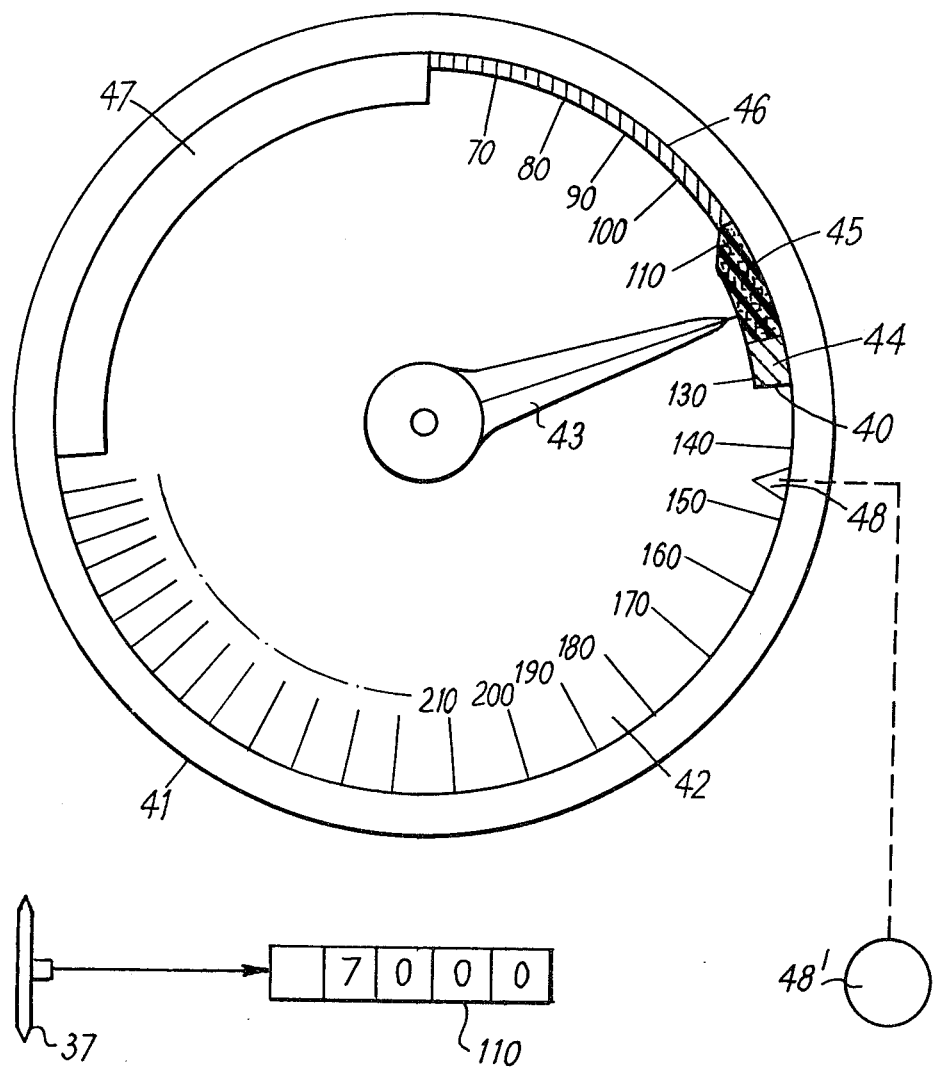
FIG. 3 shows the face of an airspeed indicator of FIG. 2.

Referring to FIG. 3, this shows the dial of the airspeed indicator (ASI) 41. This has the normal scale 42 graduated in knots and the normal movable index in the form of a pointer 43. The auxiliary index 40 driven by the step-motor 36 of FIG. 2 is of arcuate form and is moved circumferentially around the periphery of the scale 42. The index 40 is provided with a head marked in two zones 44 and 45 respectively which are preferably green in the zone 44 and yellow and black stripes in the zone 45. A tail 46 is also provided on the auxiliary index 40 and is preferably coloured red. A circumferential mask 47 is also provided behind which the index 40 is hidden except when in use during a take-off run. A further, pre-set index 48 is provided which can be manually preset by means of a knob 48' to indicate $V_1$.

Thus for any given take-off, the potentiometer (18 to 25 FIG. 1) appropriate to the parameters affecting the take-off is selected. During the take-off run the pointer 43 traverses the scale 42 indicating the measured airspeed. At the same time the index 40 traverses the scale indicating the expected airspeed as the distances run increases. Under ideal circumstances the green zone 44 of the index 40 and the pointer 43 are coincident indicating to the pilot that the acceleration performance of the aircraft is at least in accordance with expectations. If the pointer 43 keeps ahead of the green zone 44 this is a further indication that the take-off performance is satisfactory. Should the pointer 43 coincide with the black and yellow zone 45 this warns the pilot that the acceleration performance is somewhat degraded and enables him to anticipate the need to abort the take-off if acceleration does not improve. If the pointer coincides with the red tail 46 this indicates that the acceleration is substantially below that required for safety and enables the pilot safely to put into effect abandonment procedure well before the specified decision point is reached.

In addition to the ASI display of FIG. 3 it is preferred to provide a digital indication 110 from the distance-measuring wheel 37, or Doppler Radar, Inertial Platform System or other distance-measuring arrangement. The distance indicator 110 can be arranged to indicate distance run, distance to the decision point or distance to the end of the runway. By mounting this indicator closely adjacent to the indicator of FIG. 3 the observation of acceleration-performance and distance during a take-off run is simplified and decision-making facilitated.

It will be appreciated that the eight potentiometers of FIG. 2 enable improved but nevertheless coarse control to be effected over the second index 40. To enable even finer control to be effected over the second index, means can be provided whereby additional resistance banks can be connected together to control whichever of the eight potentiometers of FIG. 2 is selected. The additional resistance is made variable in accordance with the parameters which affect the take-off performance of the aircraft as will now be described.

Figure 4:
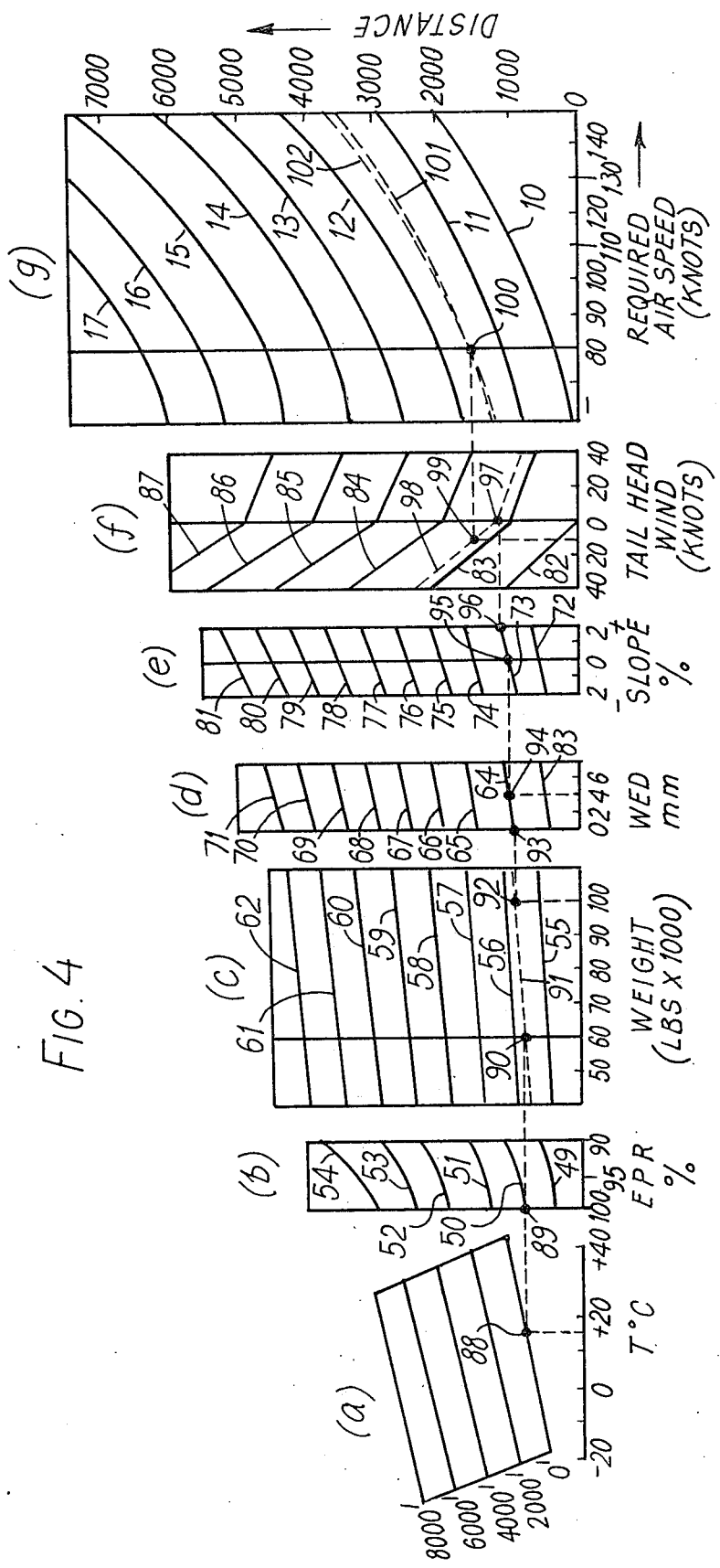
FIG. 4 shows seven families of curves for use in calculating what the acceleration performance of an aircraft should be during its take-off run.

Referring first of all to the families of curves shown in diagrams (a) to (g) of FIG. 4, these enable a curve to be drawn finally in diagram (g) indicative of any one of an infinite family of curves relating calculated required airspeed during a take-off run, having regard respectively to: the elevation of the airfield above sea level and the ambient temperature, diagram (a); the engine power used (EPR) expressed as a percentage of total available power (down to 90%), diagram (b); the all-up weight, diagram (c); runway surface condition e.g. precipitation or friction, in terms of a water equivalent depth (WED) diagram (d); the slope of the runway up (+) or down (−), diagram (e); the wind component, tail or head, diagram (f); and finally the family of curves diagram (g)) 10 to 17 of FIG. 1.

Such families are known, it being understood that the family of diagram (g) is for a given flap setting and different such families are required for each flap setting. They are used for calculating what the performance should be for the aircraft concerned on each take-off.

In diagram (a) there are five curves with the reference, 0′, 2000′, 4000′, 6000′ and 8000′ and the abscissa is marked in degrees centigrade. Diagram (b) has six curves 49 to 54 and the abscissa is calibrated in percentage of total available engine power used with a vertical reference line at 100%. Diagram (c) has eight curves 55 to 62 and the abscissa is calibrated in weight (lbs × 1000) with a vertical reference line at 60,000 lbs. Diagram (d) has nine curves 63 to 71 and the abscissa is calibrated in millimeters (mm) with a vertical reference line at 0 mm. Diagram (e) has ten curves 72 to 81 and the abscissa is calibrated in percentage slope (+ and −) with a vertical reference line at 0. Diagram (f) has six curves 82 to 87 and the abscissa is calibrated in tail and headwind component with a vertical reference line at 0. Diagram (g) has a vertical reference line at 80 knots.

An example of how a pilot in using such families of curves to enable him to plot finally in diagram (g) of FIG. 4 a curve related to all the conditions relevant to diagrams (a) to (f), is shown by the broken lines. In the example shown the airfield is at sea level and the ambient temperature is +15° C. The curve 0′ is used and the point 88 is determined in that curve by drawing a vertical line from the +15° point on the abscissa. A horizontal line is then drawn from the point 88 to the vertical reference line (100) in diagram (b). In this example 100% of available power is assumed to be used and hence a point 89 is defined which in this example lies on the curve 50. A horizontal line is now drawn from the point 89 to the vertical reference line in diagram (c) (at 60,000 lbs.) which it meets at 90. A curve parallel to the curve 56 and passing through the point 90 is now drawn as indicated by the broken line 91. The all-up weight of the aircraft is assumed to be 100,000 lbs. and a vertical line is drawn from the 100,000 lbs. point on the abscissa to cross the curve 91 at 92. A horizontal line is drawn from 92 to the vertical reference line (at 0) in diagram (d) which it meets at 93 on the curve 64. The WED is assumed to be 4 mm. and a vertical line is drawn from this point on the abscissa until it meets the curve 64 and defines point 94. A horizontal line is drawn from 94 to the vertical reference line (at 0) in diagram (e) which it meets at 95 on curve 73. The slope of the runway is assumed to be +2% and a vertical line is drawn from the abscissa at this point to meet the curve 73 at 96. A horizontal line is now drawn from 96 to the reference line (at 0) in diagram (f) which it meets at 97. A curve 98 is now drawn through 97 parallel to the curve 83. It is assumed that there is a tail wind component of 10 knots. A vertical line is drawn from this point on the abscissa to reach curve 98 at 99. A horizontal line is drawn from 99 to the vertical reference line (at 80 knots) in diagram (g) which it meets at 100. The point 100 is on none of the curves 10 to 17 and a final curve 101 is drawn midway between the two curves 11 and 12. The curve 101 represents the performance that the aircraft should have on take-off.

It will be appreciated that in diagrams (a) to (f) of FIG. 4 many more curves can be embodied whereby a high degree of accuracy can be obtained without the need for drawing in curves such as 91 in FIG. 4(c) and 98 in diagram (f). It will also be appreciated that in diagram (g) a high degree of accuracy can be obtained by using a fixed offset from the curve 12 to provide a final curve 102. The accuracy of the curve 102 could be made even better by using more than eight basic curves 10 to 17 shown.

Finally it will be appreciated that by using potentiometers to provide resistance tappings in accordance with the laws of the curves shown in diagrams (a) to (f) of FIG. 4 it is possible for a law in accordance with a required curve such as 102 in diagram (g) to be provided.

Figure 5:
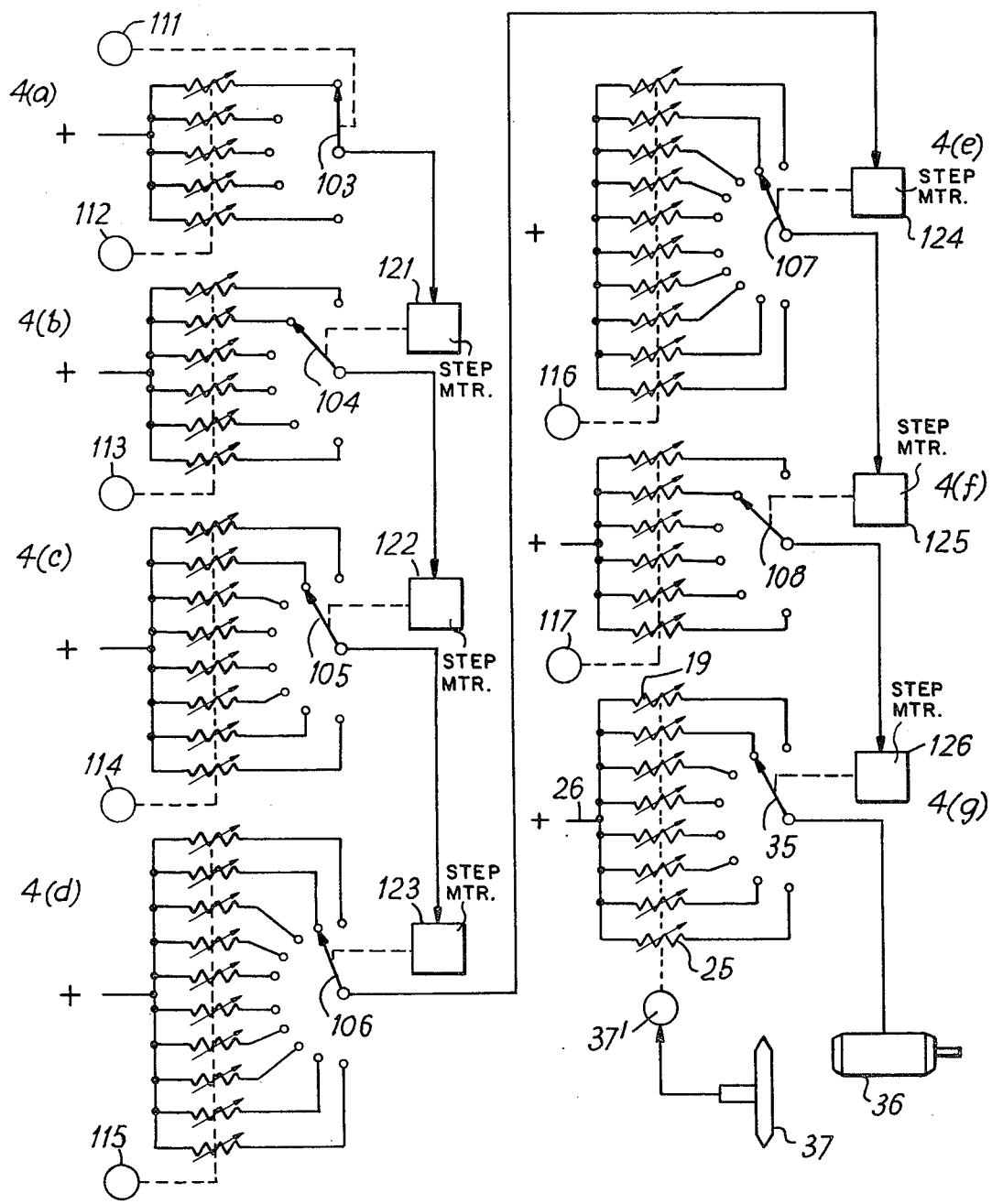
FIG. 5 is a circuit diagram of part of a preferred modification of FIG. 2.

FIG. 5 shows an arrangement for implementing the operation described above with reference to FIG. 4. In addition to the potentiometer bank of FIG. 2, shown again at the bottom right-hand part of FIG. 5, six further potentiometer banks are provided each for a respective one of the series of curves of diagrams (a), (b), (c), (d), (e) and (f) of FIG. 4. The potentiometers of each of these banks, equal in number to the number of curves of the associated diagram of FIG. 4, are ganged together for operation as by a knob. Thus the knobs 111 to 117 receive the following inputs 111 — runway height
112 — temperature
113 — EPR
114 — weight
115 — WED
116 — runway slope
117 — wind speed.

Knobs 112 to 117 control a respective potentiometer bank and knob 111 controls a selector switch 103 associated with the first potentiometer bank. The subsequent switches 104 to 108 and also 35 are in each case controlled by the output from the preceding potentiometer bank. A respective one of six voltage-controlled step motors 121 to 126 moves the switch arm 104 to 108 to the switch contact which corresponds most nearly to the curve defined by the voltage from the preceding bank. In this simplified form (included for ease of illustration) the operation differs from that of FIG. 4 in that there is no interpolation between curves, but rather the nearest curve is selected in each case. To provide for interpolation between curves the switching circuitry of each potentiometer bank can be replaced by that of FIG. 5A, in which each potentiometer is connected via a multiplier circuit to an adder. Each multiplier circuit receives an output from control circuitry which controls the multiplication factor of the multiplication circuit. In the control circuitry the signal from the preceding potentiometer bank is compared with a plurality of potentials corresponding to the fixed curves of the potentiometers of the bank being controlled. In FIG. 5A for simplicity this is assumed to comprise three potentiometers only, representing three curves. If the received signal corresponds to a point above the curve of the upper potentiometer, an amplifier $A_1$ is enabled and the top multiplier $M_1$ is set to a multiplying factor of unity while the others are zero. If the received signal corresponds to a point between the upper and middle curves, then a differential amplifier $A_2$ is enabled which controls the multiplication of both multipliers $M_1$ and $M_2$ in dependence upon the relation between the voltage from the preceding bank and a reference. Differential amplifier $A_3$ likewise controls multipliers $M_2$ and $M_3$, and amplifier $A_4$ controls multiplier $M_3$ alone. In this way, interpolation can be achieved at any point between the upper and lowermost curves.

The adjustment of the appropriate potentiometers in accordance with the various parameters can be effected entirely manually by the pilot, as described above, or, at least in part, automatically. For example, the curves of diagram (g) of FIG. 4 vary in dependence upon flap setting and hence a different final group of potentiometers must be provided for different flap settings and an additional selector switch to enable the group appropriate to each flap setting to be selected. This can be effected automatically by coupling the additional selector to the flap-setting lever. A direct coupling from the altimeter may be used to select the appropriate elevation-simulating potentiometer. The wipers of the elevation-simulting potentiometers may be set by a temperature-sensor acting on the wipers through a transducer. Strain gauges on the legs of the aircraft can be used to set the wipers of the weight-simulating potentiometers. Such automatic setting of the potentiometers further reduces the chances of manual error and increases the instrumental accuracy. Some or all of the parameters can be set in with the use of punched cards or like devices.

Furthermore graduated thrust techniques are used where possible under which less than full available power is used for take-off in order to save fuel. To facilitate these techniques a thrust computer is installed in the aircraft and causes indexes on the engine-power-ratio (EPR) gauges to denote the thrust value required. The control signal derived for use in carrying out the present invention can additionally be applied to the thrust computer to up-date the indexes as the take-off progresses and indicate whether the EPR is correct or needs to be increased or decreased. The current U.K. and U.S.A. procedures limit thrust reduction to no more than 10% to allow a substantial safety margin. The present invention would safely permit a larger reduction when prevailing conditions permit. The percentage of take-off power versus a given stage length is a substantial economic variable and hence this application of the invention could be of significant economic importance.

I claim:

1. A take-off performance indicator system, comprising:
    means electrically defining a plurality of different speed versus distance curves;
    means actuable for selecting a desired one of the said curves in dependence upon parameters relevant to an individual take-off;
    means for generating a first electrical signal dependent upon distance traversed by the aircraft during a take-off run;
    means for applying said first electrical signal to said curve-defining means to generate a second electrical signal representative of the speed associated in the selected curve with the distance defined by the first signal; and
    means for providing a display dependent upon the second signal, wherein the selecting means is adapted to effect the selection in dependence upon individual take-off parameters and including means responsive to at least one of the said parameters for directly controlling said selecting means in response thereto.

2. A take-off performance indicator system, comprising means electrically defining a plurality of different speed versus distance curves;
    means actuable for selecting a desired one of the said curves in dependence upon parameters relevant to an individual take-off;
    means for generating a first electrical signal dependent upon distance traversed by the aircraft during a take-off run;
    means for applying said first electrical signal to said curve-defining means to generate a second electrical signal representative of the speed associated in the selected curve with the distance defined by the first signal; and
    means for providing a display dependent upon the second signal, wherein the display means comprises an index movable along the scale of an airspeed indicator, said index having three distinguishable portions thereon representing performance above, performance near, and performance below expectations.

3. A take-off performance indicator system, comprising:
    plural curve defining means electrically defining differing ones of a family of distance versus speed curves;
    means for generating an electrical signal based on the distance traveled by the aircraft during a take-off run;
    means applying said distance based signal to said plural curve defining means for generating a plurality of alternately selectable expected speed signals which vary with distance traveled and differ from each other in accord with the differences in said curves of said family, said curve defining means being potentiometers in which resistance and wiper movement respectively represent speed and distance traveled, the wipers of said potentiometers being ganged together for simultaneous movement, said applying means comprising a means electrically responsive to said distance based signal and coupled to said wipers for positioning same in accord with distance traveled in said take-off run and means supplying said expected speed signals in accord with the positions of respective potentiometer wipers;
    means energizable for displaying expected speed;
    means actuable for selecting the one of said plural curve defining means considered to best correspond to the parameter values for a particular proposed take-off and energizing said display means with the corresponding one of said expected speed signals.

4. A system as claimed in claim 3, in which said selecting means includes a multiple position to switch presetable to connect the desired potentiometer to said display means, said display means including motor means driven electrically by said selected expected speed signal.

5. A system as claimed in claim 4, in which said display means comprises an airspeed indicator including an elongate measured airspeed scale, an airspeed indicator pointer movable in response to measured airspeed along said measured airpseed scale, and an expected performance scale movable with respect to both said measured airspeed scale and said airspeed indicator by said motor, said expected performance scale having separate sections arranged in series and separately opposable by said airspeed indicator pointer to permit the latter during take-off to continuously and simultaneously to both measured airspeed values and expected performance scale sections, wherein said expected performance scale section represents aircraft performance above or below expectation for that particular take-off.

6. A take-off performance indicator system, comprising:
 plural curve defining means electrically defining differing ones of a family of distance versus speed curves;
 means for generating an electrical signal based on the distance traveled by the aircraft during a take-off run;
 means applying said distance based signal to said plural curve defining means for generating a plurality of alternately selectable expected speed signals which vary with distance traveled and differ from each other in accord with the differences in said curves of said family;
 means energizable for displaying expected speed;
 means actuable for selecting the one of said plural curve defining means considered to best correspond to the parameter values for a particular proposed take-off and energizing said display means with the corresponding one of said expected speed signals, said display means being an airspeed indicator having an elongate measured airspeed scale, an airspeed indicator pointer movable in response to measured airspeed along said measured airspeed scale, and an expected performance scale movable with respect to both said measured airspeed scale and said airspeed indicator pointer by the selected one of said expected speed signals, said expected performance scale having separate sections in series and separately opposable to said airspeed indicator pointer to permit the latter during take-off to continuously and simultaneously point to both measured airspeed and expected performance scale sections, wherein the expected performance scale sections register aircraft performance above or below expectation for that take-off.

7. A take-off performance indicator system, comprising:
 plural curve defining means electrically defining differing ones of a family of distance versus speed curves;
 means for generating an electrical signal based on the distance traveled by the aircraft during a take-off run;
 means applying said distance based signal to said plural curve defining means for generating a plurality of alternately selectable expected speed signals which vary with distance traveled and differ from each other in accord with the differences in said curves of said family;
 means energizable for displaying expected speed;
 means actuable for selecting the one of said plural curve defining means considered to best correspond to the parameter values for a particular proposed take-off and energizing said display means with the corresponding one of said expected speed signals;
 several additional plural curve defining means, each additional plural curve defining means representing an additional family of curves, said additional families representing respective additional parameters in at least one of the aircraft and its environment, tending to affect aircraft performance in take-off, data input means connected to said additional plural curve defining means for selecting the particular curve and point thereon representing the actual parameter value for a particular take-off, said additional and first-mentioned plural curve defining means being connected in series wherein the said selection setting of each said additional plural curve defining means controls a data input of the next plural curve defining means in the series, said selecting means of said first-mentioned plural curve defining means being the data input controlled by the last of said additional plural curve defining means in said series, so as to produce a said expected speed signal dependent not only on instantaneous distance traveled but also upon the additional data inputs to the series of plural curve defining means.

8. A system according to claim 7, in which said first mentioned and additional plural curve defining means each comprise a group of alternatively selectable variable resistors and a multiposition switch for selecting therebetween, one data input of each group being the selection of a given variable resistor by said switch and the other data input being the variation of said variable resistors, the series connection between each pair of said plural curve defining means including motor means responsive to the resistance selected in one of said pair for setting the position of the switch in the other of said pair.

9. A take-off performance indicator system, comprising:
 plural curve defining means electrically defining differing ones of a family of distance versus speed curves;
 means for generating an electrical signal based on the distance traveled by the aircraft during a take-off run;
 means applying said distance based signal to said plural curve defining means for generating a plurality of alternately selectable expected speed signals which vary with distance traveled and differ from each other in accord with the differences in said curves of said family;
 means energizable for displaying expected speed;
 means actuable for selecting the one of said plural curve defining means considered to best correspond to the parameter values for a particular proposed take-off and energizing said display means with the corresponding one of said expected speed signals;
 said plural curve defining means comprising a bank of potentiometers each representing a differing one of said family of distance versus speed curves, said potentiometers having wipers variable to different points said corresponding curves and said selecting means comprising a switch actuable to select a desired one of the potentiometers; and
 several additional banks of potentiometers representing aircraft and/or environmental parameters tending to influence take-off performance and including means connecting said banks in series such that the signal output of one bank controls the positioning of the switch associated with the next bank in said series; and means for interpolating between curves of a given family in which the switch for that family comprises an adder providing the switch output and a respective multiplier connecting the output side of each potentiometer of the bank to a corresponding output of the adder, and including a control circuit connected to the output of the preceding potentiometer bank for controlling the multiplication factors of said multipliers, in accord with whether the input of the preceding bank falls on or off the curves represented by the potentiometers connected to said multipliers.

10. A take-off performance indicator system, comprising:

plural curve defining means electrically defining differing ones of a family of distance versus speed curves;

means for generating an electrical signal based on the distance traveled by the aircraft during a take-off run;

means applying said distance based signal to said plural curve defining means for selectively generating a plurality of alternative expected speed signals which vary with distance traveled and differ from each other in accord with the differences in said curves of said family;

means energizable for displaying expected speed;

means actuable for selecting the one of said family of curves considered to best correspond to the parameter values for a particular proposed take-off and energizing said display means with the corresponding one of said expected speed signals;

said plural curve defining means additionally defining a plurality of additional families of curves, said additional families representing respective additional parameters in at least one of the aircraft and its environment, tending to affect aircraft performance in take-off, data input means connected to said plural curve defining means for selecting for each said additional parameter the particular curve of the respective family and point on said curve representing the actual parameter value for a particular take-off, and means responsive to the curve and point thereon selected for each parameter for controlling the curve and point thereon selected in the next family of said plurality, such that said families of curves are selected sequentially and the first-mentioned family is selected by said selecting means in dependence upon the selected curve and point thereon of the last of said additional families so as to produce a said expected speed signal dependent not only on instantaneous distance traveled but also upon the additional data inputs to the plural curve defining means.

* * * * *

UNITED STATES PATENT AND TRADEMARK OFFICE
CERTIFICATE OF CORRECTION

PATENT NO. : 4 130 015
DATED : December 19, 1978
INVENTOR(S) : John Herbert Hardy Grover It is certified that error appears in the above-identified patent and that said Letters Patent are hereby corrected as shown below:

Column 8, line 58; delete "to".

Column 9, line 5; after "simultaneously" insert ---point---.

Column 10, line 59; after "points" insert ---on---.

Column 11, line 6; delete "output" and insert ---input---.

Column 11, line 10; delete "input" and insert ---output---.

Signed and Sealed this

Eighth Day of May 1979

[SEAL]

Attest:

RUTH C. MASON
Attesting Officer

DONALD W. BANNER
Commissioner of Patents and Trademarks